United States Patent [19]
Amtsberg

[11] 3,939,670
[45] Feb. 24, 1976

[54] ROTATABLE DRILL STRING HAVING A TORSIONALLY ELASTIC SHAFT DRIVING CONNECTION WITH ROCK BIT

[75] Inventor: Lester A. Amtsberg, Utica, N.Y.

[73] Assignee: Chicago Pneumatic Tool Company, New York, N.Y.

[22] Filed: June 12, 1974

[21] Appl. No.: 478,471

[52] U.S. Cl. ...................... 64/27 B; 64/23; 175/320
[51] Int. Cl.[2] ........................................... F16D 3/14
[58] Field of Search .......... 64/23, 27 R, 27 B, 15 B, 64/15 R, 9; 175/320, 106

[56] References Cited

UNITED STATES PATENTS

| | | | |
|---|---|---|---|
| 2,953,351 | 9/1960 | Bodine et al. | 175/320 |
| 3,033,011 | 5/1962 | Garrett | 64/23 |
| 3,129,571 | 4/1964 | Reynolds | 64/27 B |
| 3,141,313 | 3/1964 | Brickett et al. | 64/27 B |
| 3,660,990 | 5/1972 | Zerb | 64/23 |
| 3,750,423 | 8/1973 | Williams | 64/23 |

*Primary Examiner*—Samuel Scott
*Assistant Examiner*—Randall Heald
*Attorney, Agent, or Firm*—Stephen J. Rudy

[57] ABSTRACT

A rotatable drill string of a rock drill in which a torsionally elastic shaft provides a rotary driving connection between the drill string and the rock bit for absorbing the usual excessive torque developing in the string during a drilling operation. A lost motion clutch member becomes effective following a predetermined extreme degree of flexing of the torsion shaft to relieve the latter of further added torque load.

2 Claims, 2 Drawing Figures

ROTATABLE DRILL STRING HAVING A TORSIONALLY ELASTIC SHAFT DRIVING CONNECTION WITH ROCK BIT

BACKGROUND OF THE INVENTION

This invention is concerned with the provision of a torque absorbing driving connection between a rotatable string of drill pipe of a rock drill and the rock bit.

The conventional string of drill pipe comprises lengths of drill pipe threadedly jointed to one another and to a rock bit at the bottom end of the string. During operation of the drill, the drill string is rotating under the power of a motor. The usual motor employed to rotate the drill string and the bit that the string carries does not have a high torque capability at a steady rate of operation but momentum developed by the motor plus the momentum of the rotating drill pipe during a drilling operation can cause a high torque pulse to be imparted to the bit and to the joints of the pipe comprising the drill string when rotation of the bit is momentarily stopped by impingement with the work. This undesirable high torque causes excessive tightening of the threaded joints connecting the sections of drill pipe and possible cracking or damage to the pipe itself. The excessive tightening of the drill pipe increases the usual difficulty later of loosening the pipe joints when withdrawing the drill string from the drill hole.

Accordingly, it is a general objective of this invention to provide means for absorbing this excessive torque so as to avoid the undesirable effects mentioned.

This objective is accomplished in the present invention by the provision of a torsionally elastic shaft connection between the drill string and the rock bit. The torsion shaft will normally suffice to absorb the excessive torque that occurs at times during a usual drilling operation. When, because of unusual circumstances, the bit stubbornly resists being rotated, a secondary drive means is provided to prevent overloading and further torquing of the torsion shaft. This secondary drive means is in the form of a clutch which responds to the latter situation to relieve the torsion shaft of further load and to transmit any added torque of the drill string directly to the rock bit.

BRIEF DESCRIPTION OF DRAWING

In order that the invention may be fully understood and readily carried into effect, the same will now be described, by way of example only, with reference to the accompanying drawing, of which.

DETAILED DESCRIPTION OF A PREFERRED EMBODIMENT OF THE INVENTION

Figure 1:
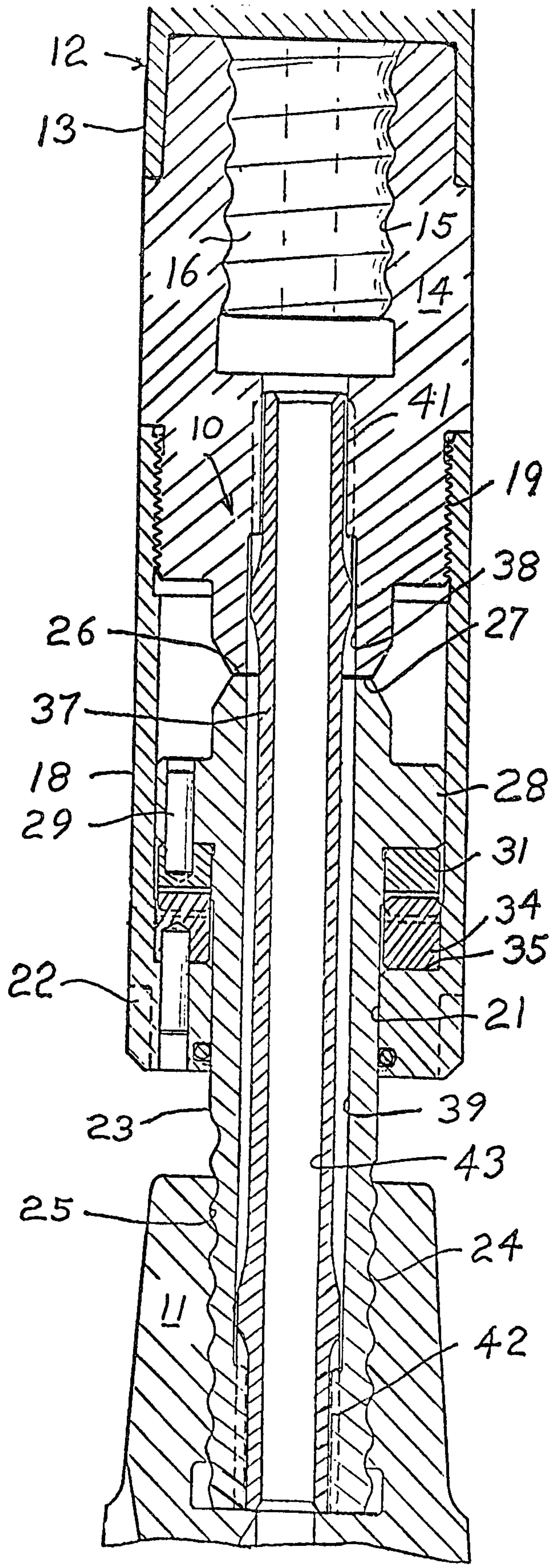
FIG. 1 is a view in longitudinal section illustrating an embodiment of the invention as connecting a rotatable section of drill string pipe with a rock bit.

Referring now to the drawing, the embodiment of the torsionally elastic shaft connection unit 10 illustrating the invention is designed, as indicated in FIG. 1, to connect in axial alignment a rock bit 11 with a rotatable rock drill string 12 of drill pipe 13.

The drill string is connected for continuous rotation during a drilling operation with a conventional rotation motor (not shown); and it is adapted to transmit to the rock bit axial thrusts imparted to the drill string by means of a reciprocating piston member of the rock drill.

The unit 10 includes a drill pipe adapter 14 having an axial socket 15 adapted to be threadedly joined to the depending pin 16 of the last pipe length or pilot section 13 of the drill string. A tubular body or coupling 18 of the unit has an internal threaded connection 19 at an upper open end thereof with the adapter; and has an axial hole 21 in a bottom end wall 22 thereof.

A cylindrical rock bit rod 23 received in the coupling extends slidably through the hole 21 and has an external threaded portion 24 adapted for joining with an axial socket 25 of the rock bit.

Within the interior of the coupling 18, the rock bit has a thrust receiving end face 26 abutting a corresponding thrust transmitting end face 27 of the drill pipe adapter, whereby downward or axial thrusts generated in the drill pipe are transmitted through the rock bit rod to the rock bit.

Intermediately of the ends of the rock bit rod, proximate the upper end of the latter, the rod has a radial annular flange or collar 28. To the underside of the latter is mounted, as by press pins 29 (one being shown), an annular driven upper jaw faced clutch member 31. The latter is provided with flat faced vertically sided jaws 32 separated one from the other by spaces 33. The spaces (as appears in FIG. 2) are greater in their circumferential dimensions than are the jaws.

An opposed lower driving jaw faced clutch member 34 is similarly mounted upon an internal annular shoulder 35 of the coupling. It has jaws 36 and separating spaces 30 corresponding in dimensions to those of the driven clutch member.

While the clutch members are shown as separate members mounted to their respective supports, they may be formed integral with the latter.

Figure 2:
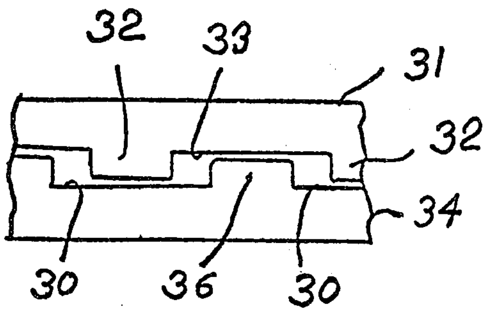
FIG. 2 is a detail of the relationship of the jaws of the clutch element in a normal condition.

The jaws of each clutch member are seated centrally of the opposed spaces of the other clutch member, as indicated in FIG. 2. This is the normal relationship of the jaws and spaces to one another during the usual operation of the drill.

This relationship is normally maintained by means of a torsionally elastic shaft 37 which provides a direct rotary driving connection between the drill string and the rock bit.

The torsion shaft 37 extends loosely through axially aligned bores 38 and 39 respectively of the drill pipe adapter and the rock bit rod. The shaft has a splined driven connection 41 at its upper end with the pipe adapter, and a splined driving connection 42 at its lower end with the rock bit rod. The portion of the shaft between its splined ends is of relatively reduced diameter. The shaft is provided with a central passage or blow hole 43 in continuance of the usual passage provided through the drill string of a rock drill to conduct compressed air through the rock bit to the bottom of the hole being drilled for purposes of clearing the latter of debris.

The connected relationship of the torsion shaft 37 to the drill string and to the rock bit rod normally retains the clutch members in the ineffective clutched condition shown in FIG. 2, wherein the clutch is normally disabled from transmitting any torque drive to the rock bit, all torque transmission being normally transmitted from the drill string through the torsion shaft to the rock bit rod and bit.

In summary of the functioning of the torsionally elastic drive shaft connection unit in the drill string: During a drilling operation, the rock bit is being continuously torqued and repeatedly thrust against the work by the drill string. The rotation of the drill string is transmitted through the torsion shaft to the rock bit and not through the clutch members. The thrusts of the drill string are transmitted to the rock bit through the contacting end faces 27, 26 respectively of the drill string and the rock bit rod.

At times, the rock bit becomes stuck in the work and offers strong resistance to being rotated. This condition is usually brief. When it does occur, the torque of the rotating drill string increases with the developing momentum of the drill string occasioned by the sudden stopping of the rock bit by the work. The excessively developing torque of the drill string is then absorbed by the torsion shaft as the latter is caused by the torque to deflect or twist in a clockwise direction relative to the rock bit.

As the torsion shaft deflects, the jaws of the driving clutch member 34 are carried by the drill string with it through a corresponding angle of motion relative to the jaws of the driven member 31. However, the relatively larger clutch spaces 30, 33 separating the clutch jaws are such as to permit a normal deflection of this nature without the driving jaws 36 effectively engaging the driven jaws 32. Usually, the stopped condition of the rock bit is brief and will be relieved by the torque of the twisting torsion shaft and by the attendant vibrations of the drill string. When relieved, the torsion shaft retwists in the opposite direction to normal condition.

However, under extreme conditions, the nature of the strata of work rock in which the rock bit becomes stuck may be such as to hold the bit stopped longer than usual. When this condition develops, the torsion shaft will continue deflecting until the clutch jaws of the driving clutch member engage those of the driven member. When this occurs, should there be any increased further torque transmitted by the drill string, it would pass through the clutch members to the rock bit until the stopped condition of the rock bit is relieved.

While the invention has been illustrated and described in detail herein, it is to be expressly understood that the invention is not limited thereto. Various changes can be made in the design and arrangement of the parts thereof without departing from the spirit and scope of the invention. Accordingly, it is my intent to claim the invention not only as shown and described herein, but also in all such forms and modifications as may reasonably be construed to fall within the spirit of the invention and the scope of the appended claims.

I claim:

1. The combination comprising a continuously rotatable rock drill string having a drill pipe pilot section defining its forward end, a rock bit, and a unit for limiting excessive torque being imparted to the joints of the drill string drivingly connecting the pilot section with the rock bit; wherein the unit comprises an adapter section of drill pipe threadedly connected to the pilot section having an axially projecting thrust transmitting end face, a coupling threadedly connected to a lower end of the adapter section having an open upper end into which the thrust transmitting end face axially depends, a rock bit rod having a shank depending axially through a hole in a bottom end of the coupling carrying the rock bit at its bottom end, the shank having a collar about its upper end located within the coupling and a thrust receiving end face projecting axially above the collar in underlying abutment with the thrust transmitting end face, a driven clutch member defined by a ring of clutch jaws facing an annular undersurface of the collar, the coupling having an internal annular shoulder faced with an opposed ring of clutch jaws defining a driving clutch member, the jaws of each clutch member being spaced circumferentially from one another by spaces of greater circumferential dimension than the circumferential dimension of the jaws of the other clutch member, and the jaws of each clutch member having a normal position seated centrally of the spaces of the other clutch member, the rock bit having an axially extending bore opening through its thrust receiving end face aligned with an axially extending bore opening out of the thrust receiving end face of the adapter section, and a torsion shaft disposed in part in the bore of the adapter section and in part in the bore of the rock bit rod, wherein the shaft has at its upper end a splined driven connection with the adapter section and has at its lower end a splined driving connection with the rock bit rod.

2. The combination as in claim 1, wherein a central blow hole in the drill string continues through the torsion shaft and opens through the bottom of the rock bit.

* * * * *